United States Patent
Erhardt

(12) 
(10) Patent No.: US 6,204,614 B1
(45) Date of Patent: Mar. 20, 2001

(54) BI-LEVEL OUTPUT ELECTRONIC HIGH INTENSITY DISCHARGE (HID) BALLAST SYSTEM

(75) Inventor: Robert Erhardt, Schaumburg, IL (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/306,912

(22) Filed: May 7, 1999

(51) Int. Cl.[7] .................................................. G05F 1/00
(52) U.S. Cl. .................... 315/307; 315/291; 315/224; 315/209 R; 315/DIG. 4
(58) Field of Search .................................. 315/307, 308, 315/DIG. 2, DIG. 4, DIG. 7, DIG. 5, 209 R, 247, 224

(56) References Cited

U.S. PATENT DOCUMENTS

| | | | |
|---|---|---|---|
| 5,327,048 | * 7/1994 | Troy | 315/240 |
| 5,406,173 | * 4/1995 | Mix et al. | 315/156 |
| 5,717,295 | * 2/1998 | Nerone | 315/307 |
| 5,751,115 | * 5/1998 | Jayaraman et al. | 315/225 |
| 5,798,620 | * 8/1998 | Wacyk et al. | 315/307 |
| 5,872,429 | * 2/1999 | Xia et al. | 315/194 |
| 5,914,572 | * 6/1999 | Qian et al. | 315/307 |

FOREIGN PATENT DOCUMENTS

| | | |
|---|---|---|
| 0481550A1 | 4/1992 | (EP) . |
| 0866646A2 | 9/1998 | (EP) . |

* cited by examiner

*Primary Examiner*—Don Wong
*Assistant Examiner*—Ephrem Alemu
(74) *Attorney, Agent, or Firm*—Bernard Franzblau

(57) ABSTRACT

A bi-level output electronic high intensity discharge (HID) ballast system includes a circuit for selectively generating a bi-level output for powering a lamp and an electronic HID ballast with a feedback loop. The system also includes an error amplifier receiving a first signal indicative of one of current and power applied to the lamp and a reference voltage and generating a control signal applied to the feedback loop to thereby control power the applied to the lamp, and a switch which controls the level of the reference voltage. Alternatively, the system includes an error amplifier receiving a feedback signal indicative of one of current and power generated by the electronic HID ballast and a reference voltage and generating a control signal applied to the feedback loop to thereby control the power applied to the lamp, and a switch which controls the level of the feedback signal.

22 Claims, 2 Drawing Sheets

BI-LEVEL OUTPUT ELECTRONIC HIGH INTENSITY DISCHARGE (HID) BALLAST SYSTEM

BACKGROUND OF THE INVENTION

The present invention relates generally to ballast systems. More specifically, the present invention relates to bi-level output electronic ballast systems, particularly to bi-level output electronic high intensity discharge (HID) ballast systems.

Electronic ballasts regulate current or power using solid-state components rather than a magnetic core. Typical electronic ballasts operate lamps at high frequencies, which increases the efficacy of the lamps by 10 to 12%, compared with conventional 60-Hz operation using magnetic ballasts. For example, an electronic ballast operating two 40-W T12 lamps can use as little as 72 W total (an 18% reduction compared with an energy-efficient magnetic ballast), while reducing light output only slightly. In addition to the reduced power requirements, most electronic ballasts offer several other advantages over magnetic ballasts including: reduced flicker; reduced noise; reduced heat output; the ability to operate a plurality of lamps; and reduced weight. Some electronic ballasts also operate lamps at a reduced light output such as 75% of full light output, with a corresponding additional power reduction. Electronic ballasts that permit continuous dimming of fluorescent lamps to less than 1% of full light output also are known. Conventional electronic HID ballast systems offer similar advantages in terms of tight power regulation, small size, and low weight. However, such HID ballast systems typically do not include circuitry for performing a dimming function.

Dimming systems are known for other types of lamps, e.g., fluorescent lamp dimmers employ either a separate interface (0–10V or digital), toggling of the power line, phase control of the power line, or some type of line carrier communication. Such dimming systems are often employed to promote overall efficiency, i.e., energy savings, of the lighting system. Additional energy savings are also made possible by employing occupancy detectors in the lighting system. For example, U.S. Pat. No. 5,406,173 discloses a lighting control system including both occupancy detectors and light level detection circuitry which allows for various methods of light control using a single system.

It should also be noted that many of these known dimming systems are only compatible with specific types of occupancy sensor. It will be noted that type, as used herein, does not indicate the method of detecting occupancy, i.e., infrared or ultrasonic sensors, but rather the circuit parameters associated with the occupancy detector. For example, U.S. Pat. No. 5,130,613 discloses an occupancy detector compatible with 0–10V dimming systems which is not compatible with electronic HID ballast systems, since this type of sensor only provides a "low voltage" level output in the 0–10V range, while occupancy detectors comparable with electronic HID ballast systems switches the line voltage on and off.

U.S. Pat. No. 5,327,048 discloses circuitry which allows "bi-level dimming" of electromagnetic ballast systems. It accomplishes this by switching an additional reactive component into the low electromagnetic ballasting circuit. Moreover, the '048 patent discloses a circuit configuration whereby multiple occupancy sensors are connected to a common "control unit". However, these characteristics are not presently available in an electronic HID ballast system.

What is needed is a dimming system which is much simpler than most other conventional types of dimmers. Preferably, the bi-level output power HID electronic ballast system should be lower cost, i.e., it should be easily implemented with existing low cost occupancy sensors instead of specialized control circuitry. What is also needed is circuitry which advantageously permits the ballast to be easily configured for more than one lamp type, while concurrently reducing the number of ballasts a fixture manufacturer or sales channel has to stock. Additionally, in a system wherein a single, or multiple occupancy detectors can be employed a simplified control configuration would be beneficial.

SUMMARY OF THE INVENTION

Based on the above and foregoing, it can be appreciated that there presently exists a need in the art for an electronic high intensity discharge (HID) ballast system which overcomes the above-described deficiencies in the prior art. The present invention was motivated by a desire to overcome the drawbacks and shortcomings of the presently available technology, and thereby fulfill this need.

One object of the present invention is to provide a bi-level output electronic HID ballast system which is simple in construction and low in cost.

Another object of the present invention is to provide a bi-level output electronic HID ballast system which is compatible with existing low cost occupancy sensors instead of specialized control circuitry.

Still another object of the present invention is to provide a bi-level output electronic HID ballast system which permits the ballast to be easily configured for more than one lamp type, while concurrently reducing the number of ballasts a fixture manufacturer or sales channel has to stock.

A still further object of the present invention is to provide a bi-level output electronic HID ballast system wherein a single, or multiple occupancy detectors can be employed with a simplified control configuration.

Yet another object of the present invention is to provide a bi-level output electronic HID ballast system which, when combined with a wide range preconditioner, e.g., a 100–277V preconditioner, can be used to cover a plurality of applications, e.g., 100V, 120V, 127V, 200V, 230V, 240V, 277V, 70 W and 100 W.

These and other objects, features and advantages according to the present invention are provided by a circuit for selectively generating a bi-level output in system powering a lamp, the system having an electronic HID ballast with a feedback loop. Preferably, the circuit includes an error amplifier receiving a first signal indicative of one of current and power applied to the lamp and a reference voltage, and generating a control signal applied to the feedback loop to thereby control power applied to the lamp, and a switch which controls the level of the reference voltage.

These and other objects, features and advantages according to the present invention are provided by a circuit for selectively generating a bi-level output in a system powering a lamp, the system having an electronic HID ballast with a feedback loop. Advantageously, the circuit includes an error amplifier receiving a feedback signal indicative of one of current and power generated by the electronic HID ballast and a reference voltage and which generates a control signal applied to the feedback loop to thereby control the power applied to the lamp, and a switch which controls the level of the feedback signal.

These and other objects, features and advantages according to the present invention are provided by a circuit for selectively generating a bi-level output in a system powering a lamp, the system having an electronic ballast with a feedback loop. Preferably, the circuit includes an error amplifier receiving a first signal indicative of one of current and power associated with the electronic ballast and a reference voltage and which generates a control signal that is applied to the feedback loop to thereby control power applied to the lamp, and a switch which controls one of gain of the error amplifier and the reference voltage applied to the error amplifier.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

The dimming technique in the bi-level output electronic HID ballast system according to the present invention involves using a separate wire that can be connected to either the "black" or "white" input lead, i.e., line or line neutral, of the lighting system to produce either dimming or increased power, depending on the configuration. This technique advantageously can be implemented by connecting the extra lead to a circuit that switches reference levels applied to a power control feedback circuit in the ballast circuitry. It will be noted that the electronic HID ballast system discussed immediately below includes such a feedback circuit. For example, the PHILIPS MHC070 electronic HID ballast includes feedback circuitry controlling the output power level of the ballast. U. S. Pat. No. 5,229,927, which is incorporated herein by reference, discloses another variation of a power control loop similar to the control loop used in the MHC070. It will be appreciated that the inventive circuitry is fully compatible with the circuit described in the '927 patent, as well as other HID ballasts employing feedback loops for either power or lamp current control. Thus, the dimming technique according to the present invention can be extended to be used in other types of feedback.

Moreover, the bi-level output electronic HID ballast system according to the present invention advantageously can be employed to accommodate two different lamp power levels, e.g., 70 W and 100 W lamps, without changing the actual electronic HID ballast. Stated another way, the preferred embodiments of the present invention advantageously can be employed to select between two different, permanent power levels, as will be appreciated from the discussion which follows.

When configured to produce increased power with connection to an input lead, an occupancy detector can be employed to dim the lights (and save energy) when nobody is present in a space and to have full light appear when a person enters the space covered by the occupancy detector.

It is also possible to "parallel" the control wires (for ballasts on the same electrical circuit or sharing the same neutral) with a single or multiple occupancy sensors. When multiple sensors are used, detection at one sensor advantageously can be employed to turn on, i.e., increase the output of, all of the lights.

Figure 1:
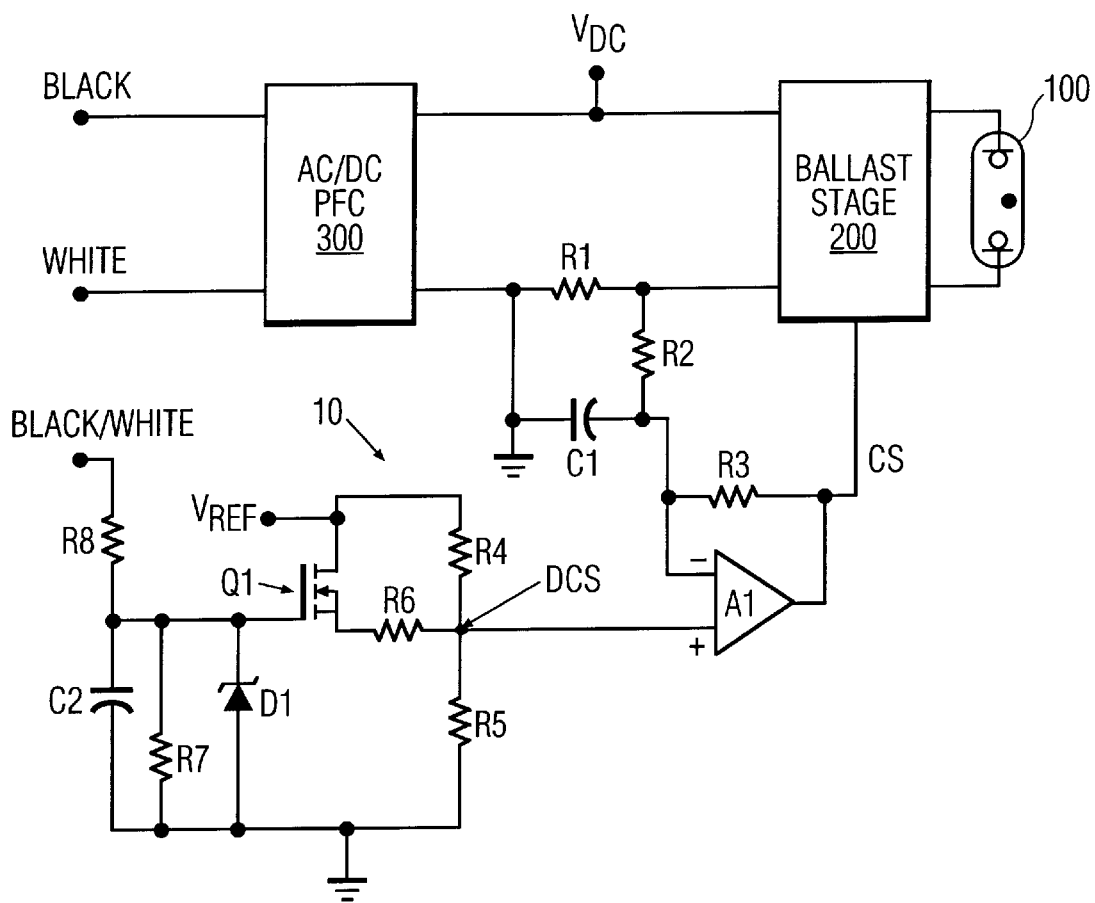
FIG. 1 is a partially schematic, partially block diagram of a first preferred embodiment of an electronic high intensity discharge (HID) ballast system according to the present invention.

FIG. 1 shows a first preferred embodiment of a bi-level output electronic HID ballast system according to the present invention, i.e., circuitry for switching between first and second reference voltage levels connected to an electronic HID ballast which has a feedback loop capable of controlling the output current or power delivered to a lamp at first and second levels responsive to changes in applied reference voltage. It will be appreciated that in such an electronic HID ballast, a signal will be sensed that provides an indication of lamp current or power, which sensed signal is compared with a reference signal in an error amplifier. The output of this error amplifier advantageously can be employed as a control signal to control the output of the ballast, e.g., by PWM control, current control, frequency control, etc. In an exemplary case, the electronic HID ballast employs peak current mode pulse width modulation of a DC/DC buck converter.

The bi-level output electronic HID ballast system according to the present invention involves using a third, i.e., the BLACK/WHITE, lead as an input to the electronic HID ballast system to turn on and off a semiconductor device which, in turn, switches an additional resistor into and out of either the feedback path or of a resistor divider of the reference circuit, thereby changing the power level of the ballast. This third lead advantageously permits a user to choose between two power levels with one electronic HID ballast, allowing either multiple lamp operation, e.g., operation of both 70 W and 100 W lamps from one ballast, or dimming.

The first preferred embodiment according to the present invention will now be described while referring to FIG. 1, wherein a lamp 100 is energized by a ballast 200 controlled by a control network 10 and powered by an AC/DC power factor correction (PFC) circuit 300. Preferably, PFC 300 is a unity power factor boost circuit which produces a well-regulated DC voltage VDC. Advantageously, the ballast 200 is controllable via a control signal CS from control network 10 which increases current/power applied to the lamp 100 when the control signal CS increases and decreases the current/power applied to the lamp 100 when the control signal CS decreases.

It will be noted that a resistor R1 is included in one line connecting the PFC 300 to the ballast 200, which resistor provides a mechanism for sensing the DC current between the stages of the bi-level output electronic HID ballast system according to the present invention. It will be appreciated that since VDC is constant, the current sensed via R1 provides a direct measure of power through the bi-level output electronic HID ballast system. The combination of resistor R2 and capacitor C1 form a filter circuit for removing any AC component from the current sensed by resistor R1. The output of the filter stage is a DC current signal indicative of power in the bi-level output electronic HID ballast system.

Error amplifier A1 compares the DC signal generated across capacitor C1 with a selectable reference voltage DCS produced by the voltage divider constructed from resistors R4 and R5, which voltage divider is provided with a reference voltage $V_{REF}$. It will be appreciated that resistor R3, in cooperation with resistor R2, sets the gain of the error amplifier A1.

The transistor Q1, which, in an exemplary case can be, but need not be, a MOSFET transistor, is employed as a switch to selectively connect resistor R6 into and out of the resistor divider network employed to generate DCS. From inspection of FIG. 1, it will be appreciated that when transistor Q1 is "ON," resistor R6 is connected in parallel with resistor R4, which increases the voltage DCS applied to the non-inverting pin of error amplifier A1. It will be noted that increasing the voltage DCS causes the power to increase. In contrast, when transistor Q1 is "OFF," the connection to resistor R6 is left open; thus, the power produced by error amplifier A1 is reduced to a relatively lower power level.

When the BLACK/WHITE lead is connected to the line neutral (or line), a half-wave rectified line voltage signal V1 is developed at the BLACK/WHITE lead with respect to circuit ground. Resistors R8 and R7 advantageously form a voltage divider network to reduce V1 to a voltage level V2 suitable for operating transistor Q1. Preferably, filter capacitor C2 is coupled across resistor R7; this capacitor filters out the AC component of the voltage V2, thereby producing the needed DC signal for operation of the transistor Q1. It will be appreciated that zener diode D1 limits the voltage across the MOSFET transistor Q1. It should be noted that the values of resistors R8 and R7 are selected to ensure that the voltage V2 applied to the transistor Q1 is sufficient to fully operate the transistor and to ensure that the time constant of the resistor-capacitor combination is relatively long.

From the discussion presented immediately above, it will be appreciated that when the BLACK/WHITE is connected to neutral, power is increased. In contrast, when the BLACK/WHITE is left open, the resistor R7 acts a discharge path to C2, the discharge of which pulls the gate of transistor Q1 to ground, turning transistor Q1 off, which results in a decrease in power. It should be mentioned that in the discussion with respect to power increases and decreases, it will be understood that the output of the error amplifier Al causes the control signal CS to vary between first and second predetermined levels, which, since control signal CS effectively varies the reference voltage employed by the electronic HID ballast, results in variation of the current/power supplied to the lamp 100 by the electronic HID ballast 200.

Figure 2:
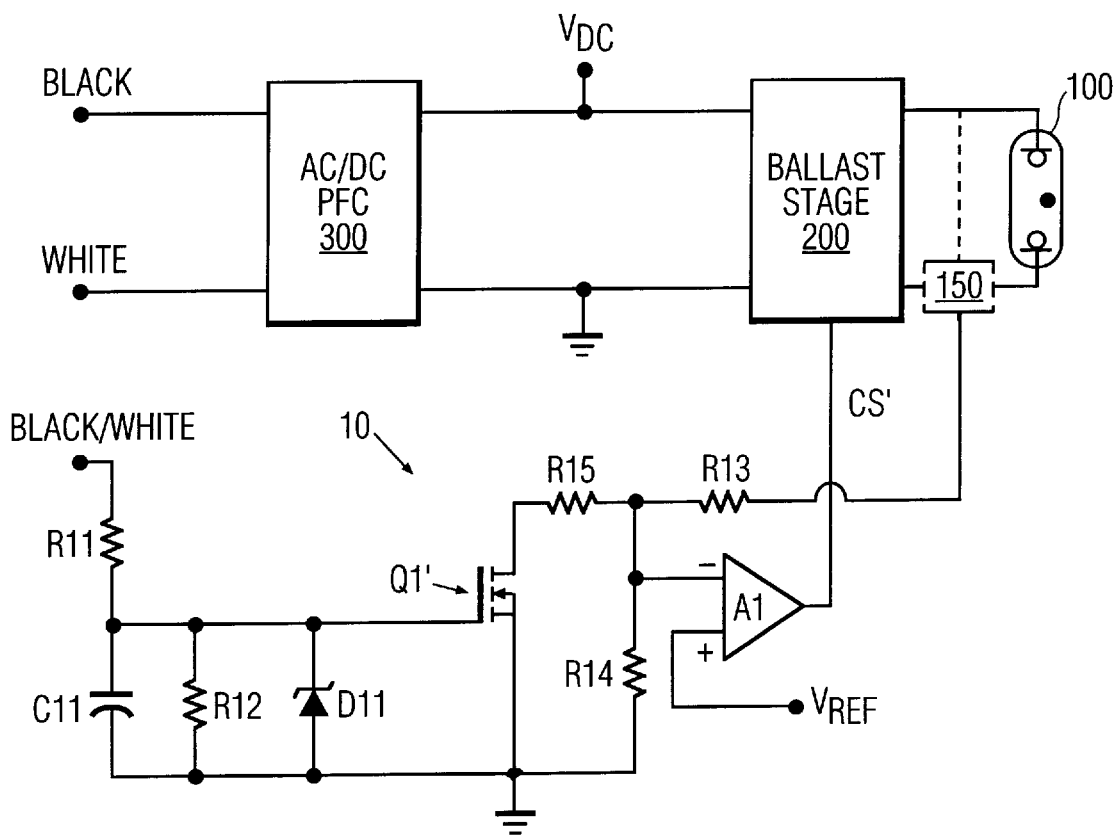
FIG. 2 is a partially block, partially schematic diagram of a second preferred embodiment of an electronic HID ballast system according to the present invention.

FIG. 2 illustrates a second preferred embodiment according to the present invention wherein a resistor R15 advantageously can be switched into or out of the gain resistor divider network constructed from resistors R13, R14 and R15 to vary the magnitude of control signal CS'. Thus, the circuitry for controlling the magnitude of CS' advantageously can be "inverted" with respect to the circuitry employed in generating CS at the user's discretion. It will be noted from inspection of FIG. 2 that, since FIG. 2 represents a feedback configuration, an optional current/power sensor 150 can be employed to sense the power applied to lamp 100. Alternatively, the feedback signal indicative of the output power/current of the electronic HID ballast 200 can be internally generated by the ballast. It will be appreciated that resistors R11 and R12, capacitor C11 and zener diode D11 perform the same functions as the elements R8, R7, C2 and D1 found in FIG. 1. In the interest of brevity, the discussion of corresponding elements included in an alternative embodiment of the bi level output electronic HID ballast system according to the present invention will not be provided.

Figure 3:
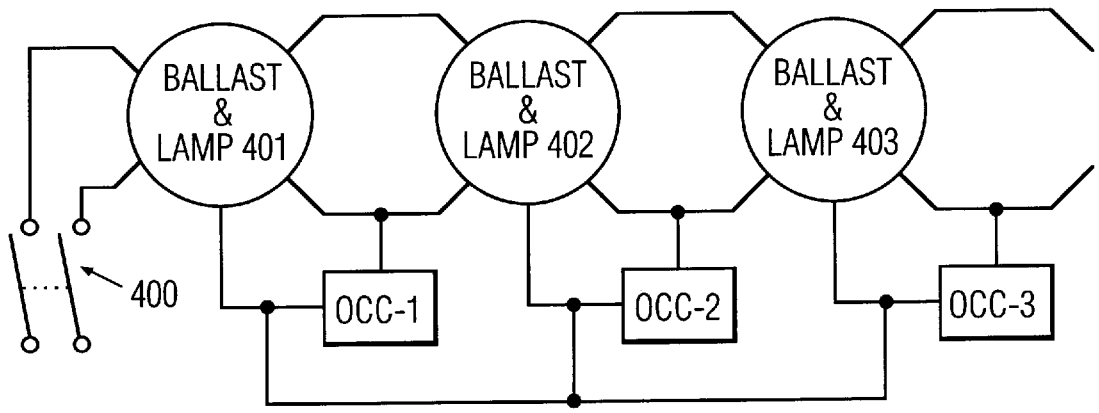
FIG. 3 is a high level block diagram of a lighting system equipped with occupancy detectors employing the systems illustrated in FIGS. 1 and 2.

FIG. 3 illustrates a lighting system including a plurality of lamp and ballast units 401, 402, 403, . . . , 40N, and associated occupancy detectors OCC-1, OCC-2, OCC-3, . . . , OCC-N, where N is a positive integer. The lighting system advantageously can be operated from a single switch 400. It will be appreciated that any one of the occupancy detectors OCC-N advantageously can increase the output of a corresponding lamp and ballast unit 40N by operating a relay in the occupancy detector which connects one of the BLACK and WHITE leads energized by switch 400 to the BLACK/WHITE lead, as shown in FIGS. 1 and 2. Thus, when the internal relay of occupancy detector OCC-2 closes, indicating that the space is now occupied, that relay activation advantageously can be employed to increase the output of unit 402. Moreover, it will be appreciated that the activated relay in OCC-2 causes an increase in the output of units 401, 403, . . . , 40N, due to the OR configuration of the occupancy detector outputs. Alternatively, activation of one of the occupancy detectors OCC-N can generate a signal applied to BLACK/WHITE lead to directly influence the output of the unit 40N.

Moreover, it is also possible to change the polarity of the switching action of the BLACK/WHITE lead through proper configuration of the switch in OCC-N. It should be noted that this polarity was chosen to allow the use of occupancy detectors between the BLACK/WHITE lead and neutral. With an occupancy detector OCC-N in this configuration, when someone is in the room and the occupancy detector is switched on, the unit 40N will shift to full power operation. When people leave the room and the occupancy detector OCC-N switches off, power consumed by unit 40N will go to a lower, standby level to save energy. Other switch configurations are also possible.

It will be appreciated that while the preferred embodiments according to the present invention have been depicted as employing an N-channel MOSFET transistor, a P-channel MOSFET transistor advantageously could be interchanged therefor. It will also be appreciated that the circuitry thus could be made to operate in an inverse manner, i.e., Q1 would open when power is applied and close when power is removed. It will also be noted that the switch Q1 and a plurality of resistors Ra, Rb and Rc advantageously could be configured in a myriad of ways to change the voltage drop across one leg of a voltage divider between first and second values or to change the gain setting of an error amplifier between first and second predetermined gains. It should be understood that all such variations, and all other variations which readily occur to those skilled in the pertinent art, are considered to be within the scope of the present invention.

Thus, although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A circuit for selectively generating a bi-level output in a system powering a lamp, the system having an electronic ballast with a feedback loop, comprising:

an error amplifier receiving a first signal indicative of one of current and power applied to the lamp and a reference voltage, and generating a control signal applied to the feedback loop to thereby control the magnitude of power applied to the lamp; and a switch having a switching action which controls the level of the reference voltage.

2. The circuit as recited in claim 1, wherein the switch selectively varies resistance of one leg of a voltage divider to thereby control the level of the reference voltage.

3. The circuit as recited in claim 1, wherein the switch is selectively closed and opened by respective application and removal of line voltage to a control terminal of the switch to thereby permit selective operation of the lamp between first and second power levels.

4. The circuit as recited in claim 1, wherein the switch is permanently closed by application of line voltage thereto thereby to select a first lamp power level, and wherein the switch remains open to thereby select a second lamp power level lower than the first lamp power level.

5. The circuit as recited in claim 1, wherein the switch comprises a transistor switch.

6. The circuit as recited in claim 1, wherein the electronic ballast comprises an electronic HID ballast.

7. A circuit for selectively generating a bi-level output in a system powering a lamp, the system having an electronic ballast with a feedback loop, comprising:

an error amplifier receiving a feedback signal indicative of one of current and power generated by the electronic ballast and a reference voltage, and generating a control signal applied to the feedback loop to thereby control power applied to the lamp; and a switch which controls the level of the feedback signal received by the error amplifier.

8. The circuit as recited in claim 7, wherein the switch selectively varies resistance of one leg of a voltage divider to thereby control the level of the feedback signal.

9. The circuit as recited in claim 7, wherein the switch is selectively closed and opened by respective application and removal of line voltage to the switch thereby to permit selective operation of the lamp between first and second power levels.

10. The circuit as recited in claim 7, wherein the switch is permanently closed by application thereto of line voltage to thereby select a first lamp power level, and wherein the switch remains open to thereby select a second lamp power level lower than the first lamp power level.

11. The circuit as recited in claim 7, wherein the switch comprises a transistor switch.

12. The circuit as recited in claim 7, wherein the electronic ballast comprises an electronic HID ballast.

13. A circuit for selectively generating a bi-level output in a system powering a lamp, the system having an electronic ballast with a feedback loop, comprising:

an error amplifier receiving a first signal indicative of one of current and power associated with the electronic ballast and a reference voltage, and generating a control signal applied to the feedback loop to thereby control power applied to the lamp; and a switch switchable between an on state and an off state and which controls one of gain of the error amplifier and the reference voltage applied to the error amplifier.

14. The circuit as recited in claim 13, wherein the switch selectively varies resistance of one leg of a voltage divider to thereby control one of the gain of the error amplifier and the level of the reference voltage.

15. The circuit as recited in claim 13 wherein the switch is selectively switched between the on state and the off state thereby to provide selective operation of the lamp only between first and second power levels.

16. The circuit as recited in claim 13, wherein the switch is permanently closed by application thereto of line voltage to thereby select a first lamp power level, and wherein the switch remains open to thereby select a second lamp power level lower than the first lamp power level.

17. The circuit as recited in claim 13, wherein the switch comprises a transistor switch.

18. The circuit as recited in claim 13, wherein the electronic ballast comprises an electronic HID ballast.

19. The circuit as recited in claim 13, wherein the switch is selectively closed and opened by respective application and removal of line voltage to the switch via a single line to thereby permit selective operation of the lamp between first and second power levels.

20. The circuit as recited in claim 19 further comprising first and second input lines for coupling the electronic ballast to a low frequency source of AC supply voltage for the lamp power system.

21. The circuit as recited in claim 19 further comprising an occupancy detector coupled to the electronic ballast and operable to apply and remove the line voltage to the switch via the single line as a function of the occupancy condition of an area lighted by the lamp.

22. The circuit as recited in claim 13 wherein the switch in its on state and off state provides first and second levels of said first signal, respectively, to the error amplifier thereby to vary the gain of the error amplifier between first and second values, respectively.

* * * * *